UNITED STATES PATENT OFFICE.

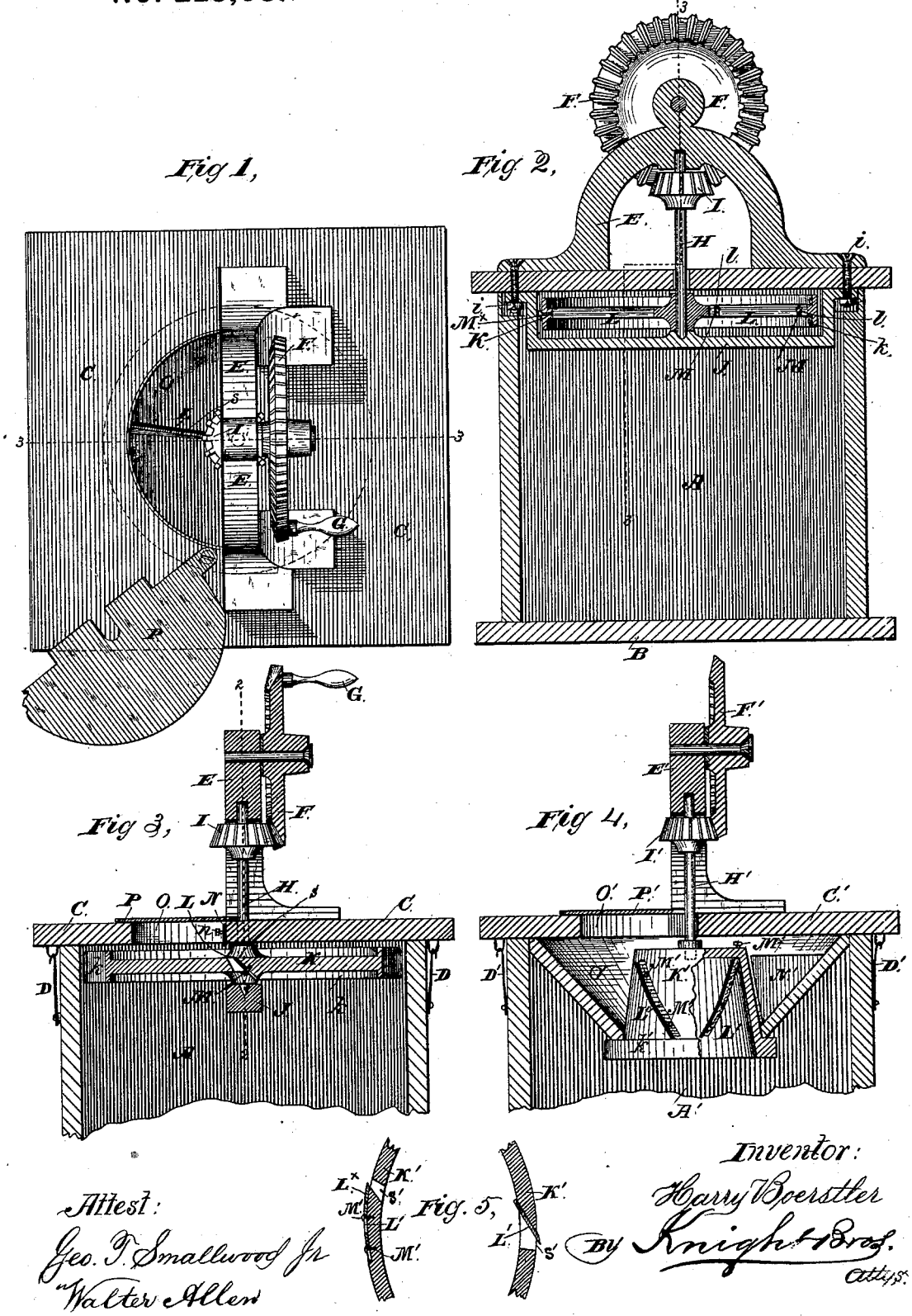

HARRY BOERSTLER, OF HAMBURG, OHIO.

VEGETABLE-CUTTER.

SPECIFICATION forming part of Letters Patent No. 225,681, dated March 23, 1880.

Application filed July 30, 1879.

*To all whom it may concern:*

Be it known that I, HARRY BOERSTLER, of Hamburg, in the county of Fairfield and State of Ohio, have invented a new and Improved Vegetable-Cutter, of which the following is a specification.

My machine is constructed with a tight box surmounted by a lid, which I prefer to attach thereto by simple hooks. On this lid is mounted the cutting apparatus, driven by a beveled crank-wheel, gearing with a beveled pinion on a vertical shaft, on which the cutter-wheel is fixed. The cutter-wheel is constructed with a rim of sufficient weight to serve as a balance-wheel. The cutters are fixed adjustably in the wheel by means of either transverse or radial set-screws, as hereinafter described, and work beneath an adjustable plate, which prevents the passage of any matter between the cutter-wheel and the under side of the lid. A hopper in the box-lid receives the vegetables to be cut, and is closed by a suitable cover.

In order that my invention may be fully understood, I will proceed to describe it with reference to the accompanying drawings, in which—

Figure 1 is a top view with the hopper-cover turned back. Fig. 2 is a vertical section on the line 2 2, Fig. 3. Fig. 3 is a vertical section on the line 3 3, Figs. 1 and 2. Figs. 4 and 5 illustrate a modification.

A represents a box, with a bottom, B, which may be permanently secured thereto. C is a removable lid, secured in position over the box by hooks D D. On the top of the lid is an arch-shaped standard, E, affording bearings for the beveled wheel F, which is turned by a crank, G, and for the upper end of the vertical shaft H, which is run by a pinion, I, meshing with the beveled wheel F, and is stepped at bottom in a bridge-tree, J, fixed to the under side of the lid C. The cutter-wheel K is fixed to the shaft H near its lower end, so as to run between the under side of the lid C and the bridge-tree J; or in large machines the cutter-wheel may be placed above the lid or table C. The cutter-wheel is formed on its periphery with a flange or rim, $k$, of sufficient thickness and weight to adapt it to serve as a balance or fly wheel.

L L represent the cutters, set in radial or tangential slots $s$ in the wheel, and fixed to any required adjustment by means of set-screws M M$^\times$, which may be applied transversely to the cutters, as shown at $m$, and occupy slots $l$ therein, or radially to the wheel, as shown at $m^\times$, and bear against the end of the cutter.

N is a guard-plate placed within the hopper O, and adjustable up or down by means of set-screws $n$, so as to place it as close as needful to the path of the cutters to prevent the passage of any matter between the cutter-wheel and the under side of the lid.

P represents a cover by which the hopper O is closed.

The box may be made either round or square, as preferred, and of suitable size, the invention being adapted to machines of all sizes, from the smallest, which may be made for domestic use, to the largest wholesale or manufacturing machines.

The bridge-tree J takes up the wear and pressure of the vertical shaft, and may be set up as required by its bolts and nuts $i$.

The wheel may be provided with as many knives or cutters as desired.

In the illustration shown in Figs. 4 and 5 the cutter-wheel is made in the form of a hollow conic frustum, as at K′; or it may be a cylinder with a balance flange or rim, $k$, as before described, and cutters L′ L′, which may be placed in concentric position on the exterior of the cone or cylinder, as shown at L$^\times$, or may be fixed tangentially, extending through the shell thereof, as at L′, and are fixed in position by set-screws $m'$ $m'$, applied in either way, as above described.

The hopper O′ is of funnel shape, extending completely around the wheel, and may extend above the top of the box or not, as preferred. The guard-plates $n'$ extend across the interior of the hopper close to the cutting-edges of the knives L′ or L$^\times$, so as to, in effect, divide the hopper into two or three or more compartments, according to the number of guard-plates used, which may be varied at pleasure, or in accordance with the size and capacity of the machine.

My machine possesses the following advantages:

First, it cuts with great rapidity and ease and without danger of cutting the fingers, as the vegetables do not have to be held singly to the action of the cutter-wheel.

Second, it is very readily cleansed, this being effected by setting the lid with wheel attached in water and revolving the wheel rapidly in opposite directions two or three times.

Third, it is always ready for use, and, being tightly closed, is always clean.

The machine is adapted for cutting slaw and vegetables of all kinds.

Having thus described my invention, the following is what I claim as new and desire to secure by Letters Patent:

1. The machine for cutting vegetables herein described, consisting of arch-shaped standard E, driving-wheels F and I, vertical shaft H, bridge-tree J, and cutter-wheel K, secured to the removable lid C, and the box A, for supporting the lid and receiving the cut material, substantially as set forth.

2. The vertically-adjustable guard-plate N, secured to one side of the hopper, as and for the purpose set forth.

HARRY BOERSTLER.

Witnesses:
  THOS. H. DOLWER,
  LEVI HITE.